United States Patent
Isozumi et al.

(10) Patent No.: US 11,096,848 B2
(45) Date of Patent: Aug. 24, 2021

(54) ASSISTANCE DEVICE FOR IDENTIFYING A USER OF THE ASSISTANCE DEVICE FROM A SPOKEN NAME

(71) Applicant: FUJI CORPORATION, Chiryu (JP)

(72) Inventors: Joji Isozumi, Nagakute (JP); Satoshi Shimizu, Chiryu (JP); Nobuyuki Nakane, Toyota (JP)

(73) Assignee: FUJI CORPORATION, Chiryu (JP)

( * ) Notice: Subject to any disclaimer, the term of this patent is extended or adjusted under 35 U.S.C. 154(b) by 173 days.

(21) Appl. No.: 16/330,888

(22) PCT Filed: Sep. 12, 2016

(86) PCT No.: PCT/JP2016/076767
§ 371 (c)(1),
(2) Date: Mar. 6, 2019

(87) PCT Pub. No.: WO2018/047326
PCT Pub. Date: Mar. 15, 2018

(65) Prior Publication Data
US 2019/0201260 A1    Jul. 4, 2019

(51) Int. Cl.
G10L 15/22     (2006.01)
G06F 40/295    (2020.01)
A61G 7/10      (2006.01)
A61G 5/14      (2006.01)
B25J 11/00     (2006.01)

(52) U.S. Cl.
CPC .......... *A61G 5/14* (2013.01); *A61G 7/10* (2013.01); *A61G 7/1017* (2013.01); *A61G 7/1019* (2013.01); *A61G 7/1086* (2013.01); *B25J 11/009* (2013.01); *A61G 7/1092* (2013.01); *A61G 7/1096* (2013.01); *A61G 7/1098* (2013.01)

(58) Field of Classification Search
CPC . G10L 15/22; G10L 2015/223; G06F 40/295; A61G 5/14; A61G 7/10
USPC ......................... 704/270, 271, 275
See application file for complete search history.

(56) References Cited

U.S. PATENT DOCUMENTS 4,207,959 A * 6/1980 Youdin ............... G10L 15/22
                                                180/167
5,047,953 A * 9/1991 Smallwood ........... A61F 4/00
                                                704/271

(Continued)

FOREIGN PATENT DOCUMENTS

CN      1507617 A      6/2004
JP   2000-325406 A    11/2000

(Continued)

OTHER PUBLICATIONS

International Search Report dated Nov. 1, 2016 in PCT/JP2016/076767 filed on Sep. 12, 2016.

*Primary Examiner* — Martin Lerner
(74) *Attorney, Agent, or Firm* — Oblon, McClelland, Maier & Neustadt, L.L.P.

(57) ABSTRACT

An assistance device that more appropriately identifies a user using speech. The assistance device is provided with a speech detector, a name acquiring section that acquires a name of a person based on speech detected by the speech detector, and a user identifying section that identifies a care receiver who is a user of the assistance device based on the name acquired by the name acquiring device.

9 Claims, 7 Drawing Sheets

| User full name | Accuracy level P | Usage time | Operation data |
|---|---|---|---|
| X Y | 70% | January 5, 11:00 | Data1 |
| P Q | 20% | January 5, 11:00 | Data1 |
| X Y | 90% | January 5, 14:00 | Data2 |
| P Q | 20% | January 5, 14:00 | Data2 |
| X Y | 90% | January 5, 15:00 | Data3 |

(56) References Cited

U.S. PATENT DOCUMENTS

| | | | | |
|---|---|---|---|---|
| 5,335,313 | A * | 8/1994 | Douglas | G10L 15/26 704/246 |
| 5,812,978 | A * | 9/1998 | Nolan | G10L 15/26 704/275 |
| 6,108,592 | A * | 8/2000 | Kurtzberg | A61G 5/04 180/167 |
| 9,301,685 | B2 * | 4/2016 | Kodama | A61B 5/0002 |
| 9,999,557 | B2 * | 6/2018 | Diaz-Flores | A61G 5/023 |
| 2002/0014951 | A1 * | 2/2002 | Kramer | A61G 12/00 340/5.8 |
| 2002/0057203 | A1 * | 5/2002 | Borders | A61G 13/08 340/573.1 |
| 2005/0049860 | A1 * | 3/2005 | Junqua | G10L 15/22 704/231 |
| 2005/0108338 | A1 * | 5/2005 | Simske | G10L 15/26 709/206 |
| 2005/0144187 | A1 * | 6/2005 | Che | G10L 15/26 |
| 2007/0294081 | A1 * | 12/2007 | Wang | G10L 15/26 704/200 |
| 2008/0300777 | A1 * | 12/2008 | Fehr | G01C 21/20 701/532 |
| 2009/0273659 | A1 * | 11/2009 | Lee | H04N 7/147 704/246 |
| 2010/0192296 | A1 * | 8/2010 | Clough | A61G 7/1051 5/83.1 |
| 2011/0098544 | A1 * | 4/2011 | Shah | G10L 15/22 704/275 |
| 2012/0136666 | A1 * | 5/2012 | Corpier | H04L 12/2829 704/275 |
| 2012/0316884 | A1 * | 12/2012 | Rozaieski | A61G 5/10 704/275 |
| 2013/0018524 | A1 * | 1/2013 | Ankers | A61G 5/045 701/1 |
| 2013/0088348 | A1 * | 4/2013 | Verachtert | G09B 5/06 340/457.1 |
| 2013/0227574 | A1 * | 8/2013 | Arikuma | G06F 11/3433 718/100 |
| 2013/0282645 | A1 * | 10/2013 | Culbertson | G06F 40/232 706/52 |
| 2013/0339858 | A1 * | 12/2013 | Corfield | G10L 15/30 715/728 |
| 2015/0170645 | A1 * | 6/2015 | Di Censo | G10L 15/22 704/275 |
| 2016/0143593 | A1 * | 5/2016 | Fu | A61B 5/6898 600/595 |
| 2017/0065757 | A1 * | 3/2017 | Tanenbaum | G10L 15/22 |

FOREIGN PATENT DOCUMENTS

| | | |
|---|---|---|
| JP | 2010-142562 A | 7/2010 |
| JP | 2013-13543 A | 1/2013 |
| JP | 2015-165879 A | 9/2015 |
| JP | 2016-77360 A | 5/2016 |

* cited by examiner

| User full name | Name | Past history |
|---|---|---|
| X Y | Mr X<br>Master X<br>Mr Y<br>Mr Yy | January 2 70%<br>January 3 70%<br>January 4 90%<br>January 4 70% |
| P Q | Ms P<br>Madam P<br>Ms Q<br>Mrs P | January 1 90%<br>January 2 70% |

| User full name | Accuracy level P | Usage time | Operation data |
|---|---|---|---|
| X Y | 70% | January 5, 11:00 | Data1 |
| P Q | 20% | January 5, 11:00 | Data1 |
| X Y | 90% | January 5, 14:00 | Data2 |
| P Q | 20% | January 5, 14:00 | Data2 |
| X Y | 90% | January 5, 15:00 | Data3 |

ASSISTANCE DEVICE FOR IDENTIFYING A USER OF THE ASSISTANCE DEVICE FROM A SPOKEN NAME

TECHNICAL FIELD

The present application relates to an assistance device.

BACKGROUND ART

Patent literature 1 discloses an assistance device that assists a care receiver in a series of movements from sitting to standing. The assistance device recognizes speech of the care receiver and recognizes a specific care receiver from a non-specific care receiver based on the speech. Further, the assistance device selects an ideal movement path corresponding to the recognized specific care receiver and performs assistance operations based on the movement path.

CITATION LIST

Patent Literature

Patent Literature 1: JP-A-2016-77360

BRIEF SUMMARY

Technical Problem

With technology disclosed in patent literature 1, because speech of a care receiver is recognized, care receivers not capable of speech cannot use the device. There are care receivers who cannot speak. It is desirable for such care receivers to be able to use an assistance device.

An object of the present disclosure is to provide an assistance device that more effectively identifies a care receiver using speech.

Solution to Problem

An assistance device of the present disclosure is for assisting movement of a care receiver, the assistance device including: a speech detector; a name acquiring section configured to acquire a name of a person based on speech detected by the speech detector; and a user identifying section configured to identify the care receiver who is the user of the assistance device based on the name acquired by the name acquiring section.

In a care facility, caregivers frequently say the names of care receivers. Here, an assistance device acquires a name from speech spoken by a person and identifies a care receiver as a user based on the acquired name. Because a caregiver can say the name of a care receiver, it is possible to acquire the name regardless of whether the care receiver can speak. Accordingly, it is possible to identify a user (care receiver) that cannot speak. Also, even if a caregiver changes, the new caregiver can say the name of the care receiver when providing assistance. Accordingly, a user (care receiver) can be identified reliably even when a caregiver changes.

DESCRIPTION OF EMBODIMENTS

Configuration of Assistance Device

Figure 1:
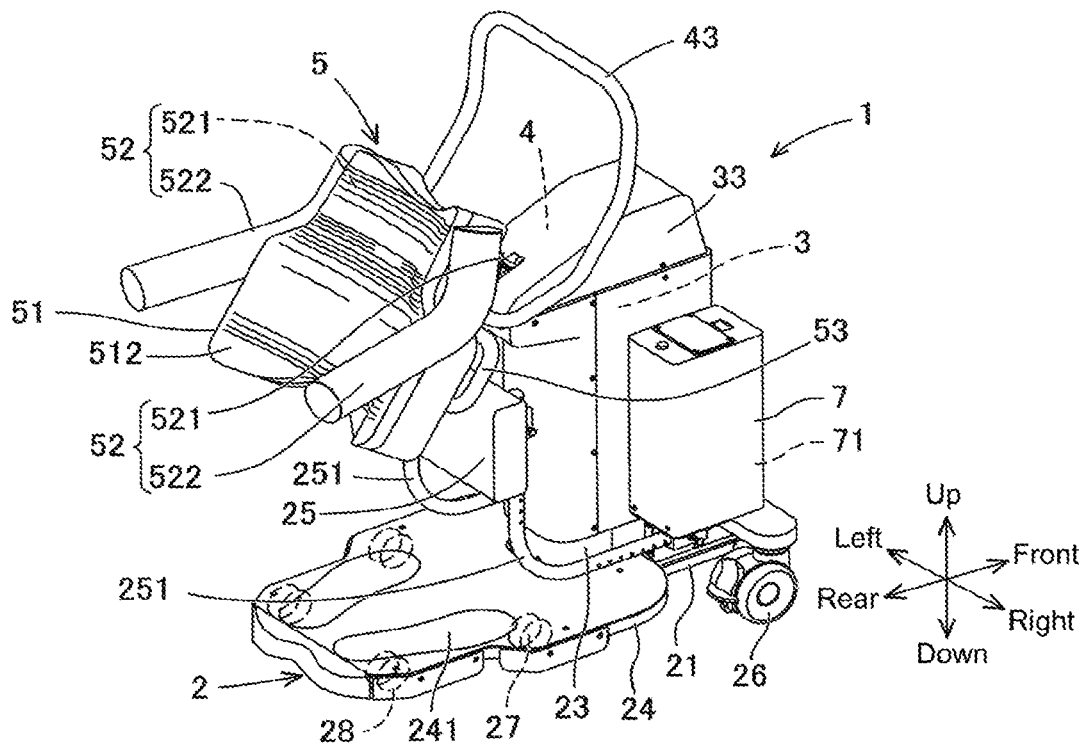
FIG. 1 is a perspective view of an assistance device seen diagonally from the rear in a state in which a care receiver is to get on in a sitting posture.

Assistance device 1 that assists a care receiver to move is described with reference to FIGS. 1 and 2. In the present disclosure, assistance device 1 is given as an example of a device that performs standing assistance and sitting assistance, but a device that performs other types of assistance may also be applied.

Assisting device 1 supports the upper body of care receiver M and assists care receiver M in standing up from a sitting posture to a standing posture. Further, assistance device 1 supports the upper body of care receiver M and assists care receiver M in sitting down from a standing posture to a sitting posture. Thus, assistance device 1 is capable of assisting care receiver to move and transfer somewhere.

A "standing posture" refers to a posture in which the lower body of care receiver M is upright, regardless of the posture of the upper body. That is, standing assistance is assistance for moving the position of the buttocks of care receiver M upwards. Further, sitting assistance is assistance for moving the position of the buttocks of care receiver M downwards.

Assistance device 1 is provided with base 2, raising and lowering section 3, oscillating section 4, body supporting member 5, load detector 6, and control unit 7. Base 2 includes frame 21, support column 22 (refer to FIG. 2), fixed cover 23, footrest 24, lower limb contacting section 25, and six wheels 26 to 28. Frame 21 is provided near floor surface F in a substantially horizontal manner. Support column 22 is provided upright on frame 21 towards the front and in the center in the left-right direction. Raising and lowering device section 32, described later, is provided inside support column 22 with a substantially rectangular cross section.

Fixed cover 23 covers and protects support column 22 and around a lower section of raising and lowering member 31, which is described later.

Footrest 24 is fixed towards the rear of an upper surface of frame 21 in a substantially horizontal manner. Foot-shaped contact marks 241 indicating a position for the feet of care receiver M are provided on an upper surface of footrest 24. Lower limb contacting section 25 is arranged above and slightly to the front of contact marks 241 and is formed by a pair of L-shaped left and right support arms 251 and 251. Lower limb contacting section 25 is arranged straddling the upright portions of the left and right support arms 251 extending in the left-right direction. Lower limb contacting section 25 is a portion for the lower limbs of care receiver M to contact and is made of a cushion material. The arrangement height of lower limb contacting section 25 can be adjusted.

Three wheels, 26 to 28, are provided respectively on both the left and right sides on a lower side of frame 21. Each of the wheels 26 to 28 has a steering function for changing the movement direction and at least front wheels 26 have a locking function for restricting movement. Due to the steering function of the six wheels 26 to 28, assisting device 1 is not only capable of moving in a front-rear direction and changing directions, but is also capable of moving laterally (moving directly to the side) and spinning (rotating on the spot).

Raising and lowering section 3 is configured from items such as raising and lowering member 31, raising and lowering drive section 32, and raising and lowering cover 33. Raising and lowering member 31 is elongated in the up-down direction and supported on the rear surface of support column 22 to be movable up and down. In the present embodiment, raising and lowering member 31 moves up and down by vertically moving with respect to support column 22, but may also be made to move up and down by pivoting with respect to support column 22.

An upper section of raising and lowering member 31 protrudes to the rear and oscillating support section 34 is provided towards the end that protrudes to the rear. Oscillating drive section 42 is provided inside an upper portion of raising and lowering member 31. Raising and lowering drive section 32 arranged inside support column 22 drives the up-down movement of raising and lowering member 31. Raising and lowering cover 33 covers and protects raising and lowering member 31 and the upper part of support column 22. Raising and lowering cover 33 is attached to raising and lowering member 31 and moves up and down with raising and lowering member 31. A lower portion of raising and lowering cover 33 that moves up and down always overlaps an outside portion of fixed cover 23.

Oscillating section 4 includes oscillating member 41, oscillating drive section 42, and first handle 43. Oscillating member 41 is formed in an arm shape. Oscillating member 41 is provided to be capable of oscillating in a front-rear direction with respect to raising and lowering member 31. Specifically, an end of oscillating member 41 is supported by oscillating support section 34 of raising and lowering member 31 to be capable of oscillating. Oscillating drive section 42 provided inside an upper portion of raising and lowering member 31 oscillates an end of oscillating member 41 in the front-rear direction around the other end of oscillating member 41.

First handle 43 is provided integrally with the other end of oscillating member 41. First handle 43 is a roughly rectangular frame. First handle 43 extends in the front upper direction from the other end of oscillating member 41. The sides of first handle 43 are gripped by both hands of care receiver M. Further, the sides and front of first handle 43 are gripped by a caregiver to move assistance device 1.

Body supporting member 5 includes items such as torso support member 51, underarm support members 52 and 52, and second handle 53. Torso support member 51 includes support main body 511 and cushion 512. Support main body 511 is made of metal and is plate-shaped. The front underside of support main body 511 is supported by the other end of oscillating member 41. Accordingly, support main body 511 can be tilted in a front-rear direction with respect to raising and lowering member by oscillating drive section 42.

Further, support main body 511 is supported in a free-tilting manner in the front-rear direction with respect to oscillating member 41. Support main body 511 is capable of tilting within a predetermined angle range in the clockwise direction of FIG. 2 from the state shown in FIG. 2. It should be noted that free-tilting does not refer to tilting driven by an actuator or the like but tilting that is done manually.

Cushion 512 is fixed to the upper rear side of support main body 511. Cushion 512 is formed from a material that easily changes shape and has a surface that closely matches the shape of the torso of care receiver M. The support surface of cushion 512 makes contact with and supports the front surface of the torso of care receiver M. In particular, cushion 512 supports a portion ranging from the chest to the abdomen of care receiver M from below.

Underarm support members 52 and 52 are provided on the left and right sides of torso support member 51. Underarm support member 52 includes a support main body 521 and an underarm arm 522. Support main body 521 of underarm support member 52 is made of metal and is supported by support main body 511 of torso support member 51 to be capable of oscillating. Underarm arm 522 supports an underarm of care receiver M. Underarm arm 522 is a rod-shaped member formed into an L-shape. The surface of underarm arm 522 is covered with a material that can flexibly deform.

Second handle 53 is integrally provided on the front surface of support main body 511 of torso support member 51. Second handle 53 is U-shaped elongated in the horizontal direction. Second handle 53 includes a base shaft fixed to the lower end of support main body 511 and extending in a left-right direction, and a gripping portion extending from both ends of the base shaft toward first handle 43.

Figure 2:
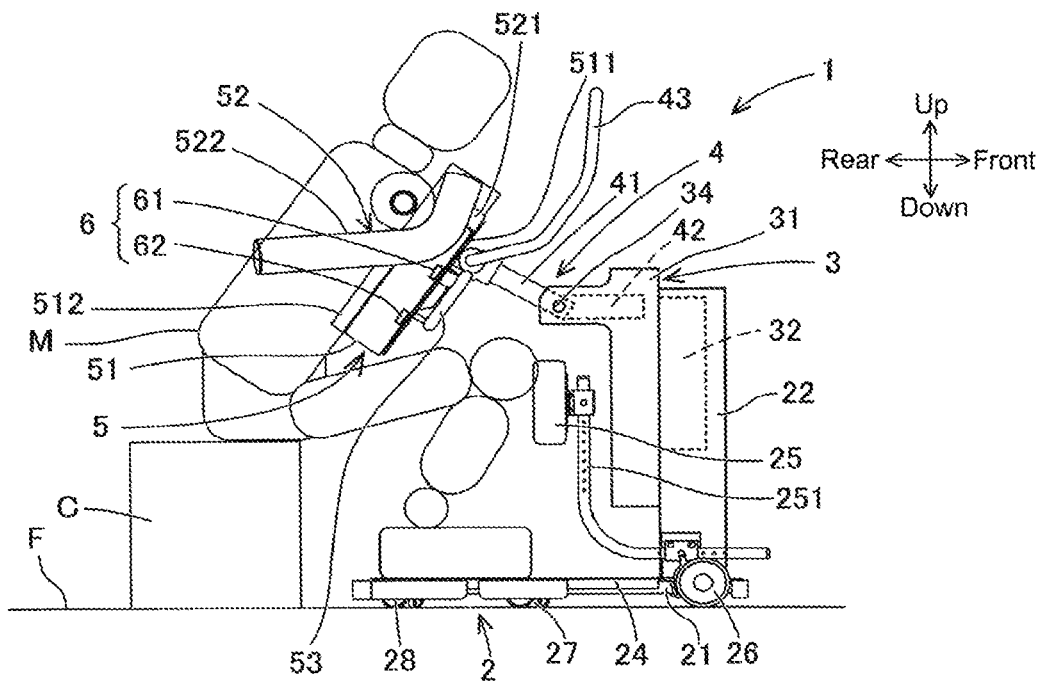
FIG. 2 is a side view of the assistance device of FIG. 1 also showing a care receiver in a sitting posture when standing assistance is to start.

As shown in FIG. 2, load detector 6 is attached to torso support member 51 and is for detecting a load applied by the upper body of care receiver M. Load detector 6 is attached to an upper surface of support main body 511 and is sandwiched between support main body 511 and cushion 512. Load detector device 6 includes first load detecting apparatus 61 and second load detecting apparatus 62.

First loading detecting apparatus 61 is provided near a central position in the up-down direction (front-rear direction) of support main body 511. First load detecting apparatus 61 corresponds to a first portion (for example, near the chest) of the upper body of care receiver M. First loading detecting apparatus 61 detects a first load applied by care receiver M. There are two first load detecting apparatuses 61 arranged separated on the left and right.

Second load detecting apparatus 62 is provided below and to the rear of first load detecting apparatus 61. Second load detecting apparatus 62 corresponds to a second portion (for example, near the abdomen) of the upper body of care receiver M that is below and to the rear of the first portion of the upper body of care receiver M. Second load detecting apparatus 62 detects a second load applied by care receiver M. There are two second load detecting apparatuses 62 arranged separated on the left and right.

Control unit 7 is provided on an upper right side of frame 21. Control unit 7 includes control device 71 that controls raising and lowering drive section 32 and oscillating drive section 42. Control device 7 controls raising and lowering drive section 32 and oscillating drive section 42 based on instructions from care receiver M or a caregiver. A computer running software may be used as control device 7. The computer may be provided with a remote control, not shown, for receiving instructions from care receiver M or the caregiver. A standing-assistance program for assisting in standing and a sitting-assistance program for assisting in sitting may be stored as executable software. A rechargeable battery pack, reference numeral omitted, is attached to the lower side of control device 71. The battery pack is also attached to the top left side of frame 21. The battery pack is also shared with raising and lowering drive section 32 and oscillating drive section 42.

Assistance Operation of Assistance Device 1

Figure 3:
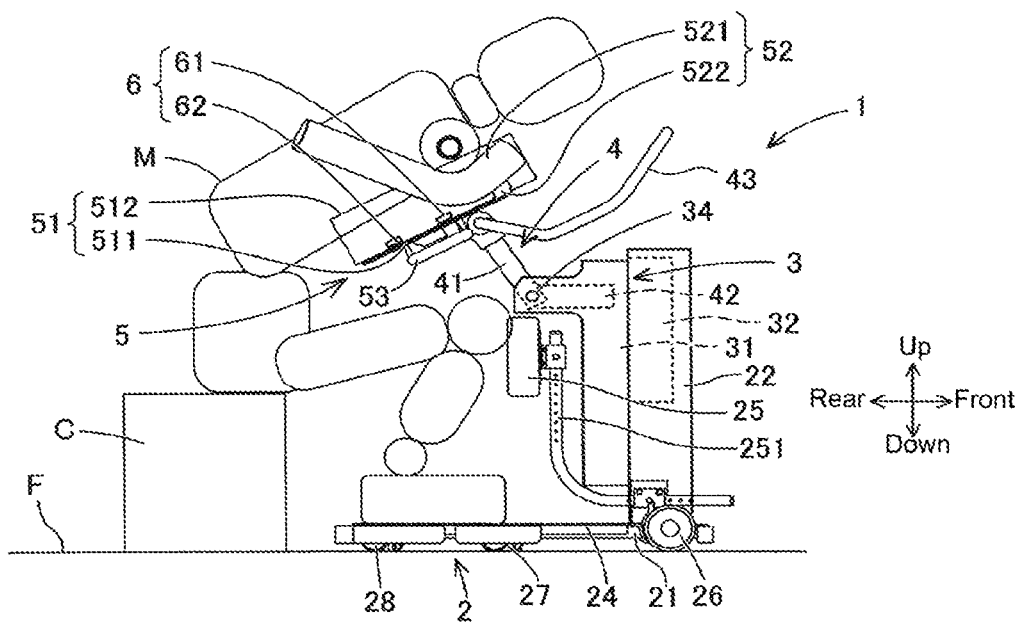
FIG. 3 is a side view of the assistance device in a state moved to a standing preparation posture with the care receiver also shown in a standing preparation posture.
Figure 4:
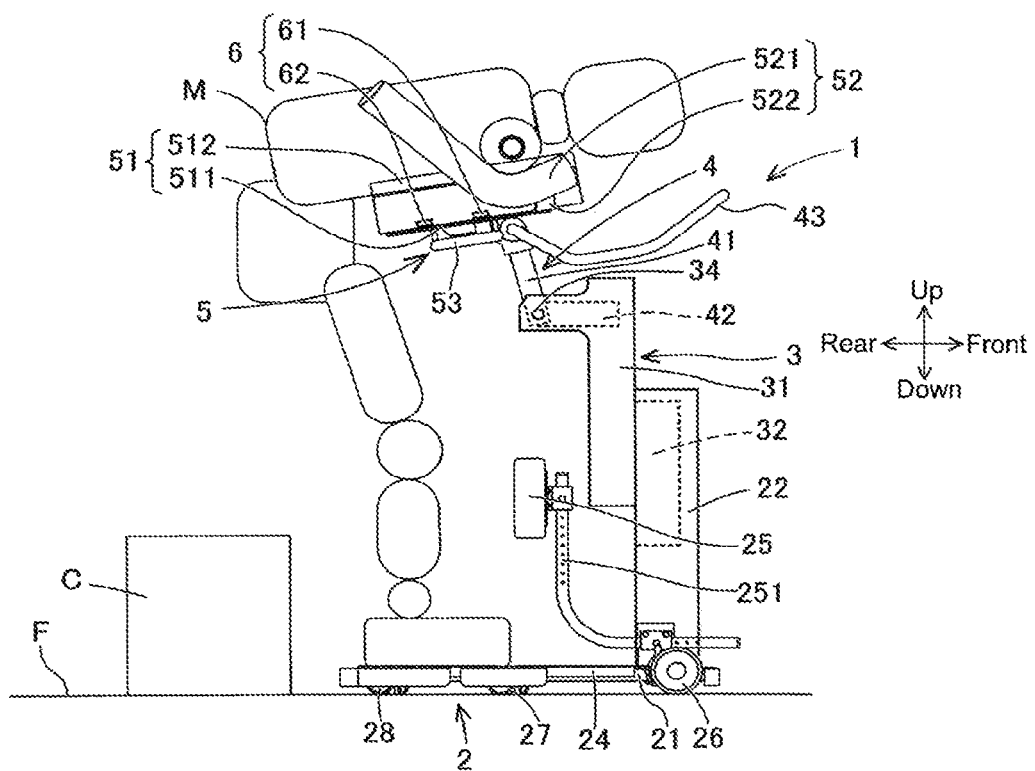
FIG. 4 is a side view of the assistance device in a state moved to a standing posture with the care receiver also shown in a standing posture.

Standing assistance of assistance device 1 is described next with reference to FIGS. 2 to 4. With standing assistance, assistance device 1 has a starting state as shown in FIG. 2, then assumes a standing preparation state as shown in FIG. 3, then a standing complete state as shown in FIG. 4.

First, a caregiver moves assistance device 1 close to care receiver M in a sitting posture. Here, as shown in FIG. 2, a caregiver moves assistance device 1 such that a care receiver M in a sitting posture can get on assistance device 1. Also, the caregiver adjusts the height of raising and lowering member 31 in accordance with the height of care receiver M. Continuing, care receiver M puts both legs under body support member 5. If body support member 5 is in the way, care receiver M or the caregiver can raise the lower end of body support member 5 manually to allow care receiver M to easily insert their legs under body support member 5.

Next, care receiver M places both feet on contact marks 241 and brings their lower legs in contact with lower limb contacting section 25. Further, care receiver M places their torso on the support surface of cushion 512 of torso support member 51. That is, the upper body of care receiver M is in a posture tilted slightly forward and supported by body supporting member 5. At the same time, care receiver M inserts underarm arms 522 under their arms. In this manner, assistance device 1 is set to the starting state of standing assistance. Then, the caregiver allows care receiver M to grip first handle 43. The posture of care receiver M at this time is the starting posture of standing assistance.

Continuing, the caregiver starts driving of assistance device 1 based on the standing assistance program of assistance device 1. By this, raising and lowering of raising and lowering member 31 is performed in conjunction with tilting forwards of oscillating member 41.

When the standing assistance program is performed, assistance device 1 enters the standing preparation state shown in FIG. 3. The standing preparation state of assistance device 1 is the state directly before care receiver M in the sitting posture is lifted from seat C. In other words, assistance device 1, from the starting state shown in FIG. 2, lowers raising and lowering member 31 and tilts oscillating member 41 forward to enter the standing preparation state shown in FIG. 3. Here, when assistance device 1 is in the standing preparation state, the buttocks of care receiver M are in contact with the seat surface of seat C and their torso is tilted forward and extended. The posture of care receiver M at this point is referred to as the standing preparation posture.

When the standing assistance program is continued, as shown in FIG. 4, raising and lowering member 31 is raised and oscillating member 41 is tilted forward further and then the standing assistance program ends. Upon this, care receiver M has changed from the standing preparation posture to a standing posture. In other words, the upper body of care receiver M in the standing posture tilts forwards a large amount and the position of the buttocks of care receiver M is higher than the seat surface of seat C. The legs of care receiver M are almost fully extended.

In this manner, after care receiver M has got onto assistance device 1 and torso support member 51 has been tilted forwards, care receiver M transfers from the starting posture of a sitting posture to a standing posture via the standing preparation posture.

Sitting assistance of assistance device 1 is performed by essentially performing a reverse operation of standing assistance. That is, by tilting torso support member 51 backwards while lowering raising and lowering member 31, care receiver M can move from a standing posture to a sitting posture. And, care receiver M in the sitting posture can easily remove their arms from underarm arms 522.

Detailed Configuration of Control Unit 7

Figures 5, 6:
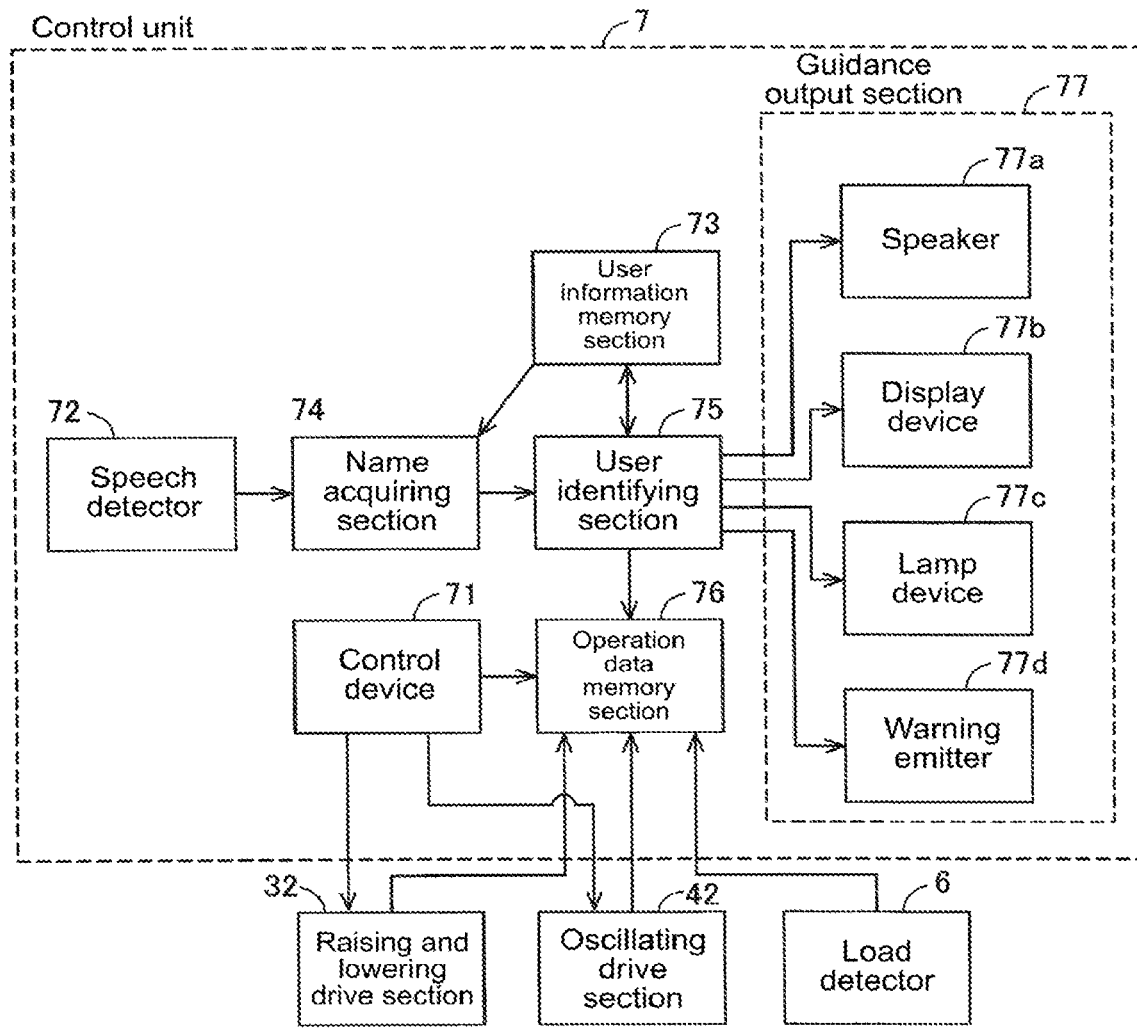
FIG. 5 is a block diagram showing a detailed configuration of a control unit of the assistance device.
FIG. 6 shows information memorized on user information memory section.

The detailed configuration of control unit 7 will be described next with reference to FIGS. 5 to 7. As shown in FIG. 5, control unit 7 is provided with control device 71, speech detector 72, user information memory section 73, name acquiring section 74, user identifying section 75, operation data memory section 76, and guidance output section 77. Control device 71 was described above so descriptions are omitted here.

Speech detector 72 detects speech around assistance device 1. Speech detector 72 is, for example, a microphone. Speech detector 72 is capable of detecting speech made by a caregiver, a care receiver, or another person in the vicinity.

User information memory section 73 memorizes in advance information related to care receiver M who is a user of assistance device 1 (also referred to as user information). As shown in FIG. 6, a full name of care receiver M as a user and a name of care receiver M are linked and memorized on user information memory section 73.

The name of care receiver M is the name by which caregivers mostly call the care receiver M. In a case in which the full name of care receiver M is "X Y", as a name using the family name Y, examples include Mr Y, Madam Y, or Master Y; as a name using the given name as a name, examples include Mr X, Master X; further, as a name unrelated to the full name, there are nicknames such as Ms P, or Ms Q. When multiple names exist for a single person, the multiple names are memorized in user information memory section 73 as user information for a single care receiver M.

Further, past history of usage of assistance device 1 is linked to the full name of care receiver M and memorized on user information memory section 73. Past history includes an accuracy level P and usage time of assistance device 1. Details are described later, but here accuracy level P refers to the probability that a user of the assistance device 1 is a given care receiver M. The past history memorized on user information memory section 73 may be memorized only when accuracy level P is, for example equal to or greater than a specified percentage (for example, 60%).

Name acquiring section 74 acquires a name of a person based on speech detected by speech detector 72. When a caregiver assists a care receiver M using assistance device 1, the caregiver says things like: "Ms X, we are going to stand you up now.", "Mr X, I'm bringing the device close to you now.", "Ms X, put your chest against here.", "Mr X, is the height OK?", and so on. Here, the caregiver frequently says the name of the care receiver M.

Here, name acquiring section 74 performs analysis of the speech detected by speech detector 72 and acquires the name of the person by recognizing titles such as "Mr", "Ms", and the like. In addition to titles, name acquiring section 74 may acquire a name of a person by recognizing speech for which it is possible that the name of a person was used. Titles or speech for which it is possible that the name of a person was used may be registered in advance on name acquiring section 74, or may be registered by being learned by name acquiring section 74 itself. Further, name acquiring section 74 may acquire the name of a person based on a name memorized on user information memory section 73.

User identifying section 75 identifies care receiver M who is a user of assistance device 1 based on the name acquired by name acquiring section 74. That is, user identifying section 75 identifies who is using the assistance device 1. In the present embodiment, user identifying section 75 selects the user from among the user information memorized on user information memory section 73 based on the acquired name. In detail, user identifying section 75 determines whether the acquired name matches a name memorized as user information, and in the case of a match, determines that the care receiver M linked to that name is the user.

Here, multiple names may exist for a given care receiver M. As shown in FIG. 6, multiple names are registered for a given care receiver M in user information memory section 73. Further, user identifying section 75, even in a case in which multiple names are acquired, when the multiple names are names of the same single person, determines that the multiple acquired names are names of the same single person and selects the user from the user information.

However, there are many people in a care facility. Therefore, names of many people are spoken around assistance device 1. As described above, the names of many people are spoken, such as the name of a care receiver M spoken by a caregiver when talking to a care receiver M who is a user, the name of a person included in conversation of people in the vicinity (other caregivers and other care receivers), and the name of a care receiver M who is a user of another assistance device 1.

Thus, in addition to identifying a user of a given assistance device 1 based on the acquired name, user identifying section 75 determines accuracy level P of the identified user. As described above, accuracy level P is represented by a percentage probability that the user of the given assistance device 1 is a given care receiver M. In the present disclosure, accuracy level P is represented as a percentage, but it may be represented by multiple levels (for example, two to three types) representing degrees of high or low probability. Further, user identifying section 75 memorizes the identified user, the determined accuracy level P, and the usage time on user information section 73. Details regarding processing by user identifying section 75 (user identifying processing and accuracy level determining processing) are described later.

Figures 7, 8:
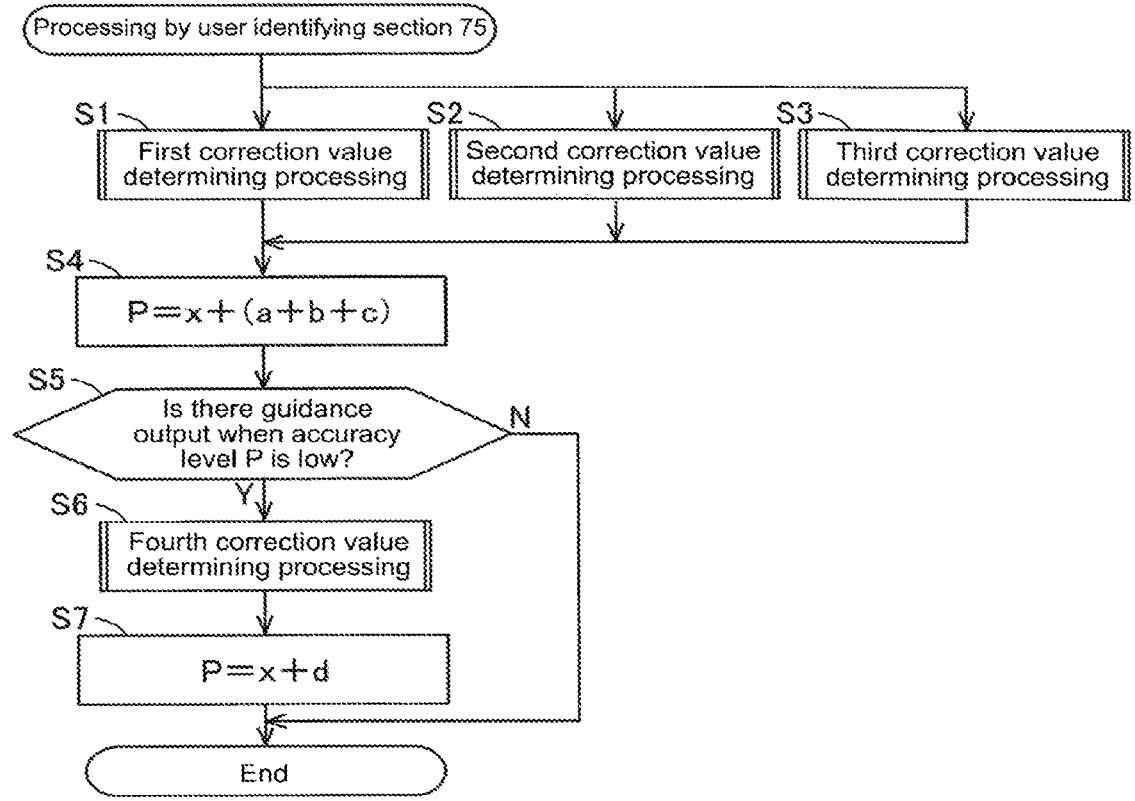
FIG. 7 shows information memorized on operation data memory section.
FIG. 8 is a flowchart showing processing by the user identifying section.

As shown in FIG. 7, operation data memory section 76 memorizes assistance operation data for assistance of care receiver M by assistance device 1. Assistance operation data refers to data related to assistance operations when assistance device 1 assists a care receiver M. For example, assistance operation data includes control data for control by control device 71, driving data for driving by raising and lowering drive section 32 and oscillating drive section 42, and detection data for detection by load detector 6. Also, when assistance device 1 is provided with another detector, assistance operation data may include detection data detected by the other detector.

Further, operation data memory section 76 links and memorizes information of a user identified by user identifying section 75 and assistance operation data memorized on operation data memory section 76. Here, as described above, user identifying section 75 identifies the user and determines accuracy level P.

Thus, operation data memory section 76 links and memorizes information of the user (in the present embodiment, the user full name), the accuracy level, the usage time, and the assistance operation data.

In FIG. 7, with regard to assistance operation data 1, two people are identified as users, "X Y", and "A B". However, the accuracy level of each is different, being 70% for "X Y" and 20% for "A B". Similarly, two people are identified as users in assistance operation data 2. Of course, it is possible to identify three or greater users. When multiple people are identified as users, operation data memory section 76 links and memorizes the information of the user and accuracy level P with respect to the same assistance operation data.

Guidance output section 77 outputs in accordance with accuracy level P when assistance is started by assistance device 1. First, guidance output section 77, when assistance by assistance device 1 is started for a case in which the accuracy level P decided by user identifying section 75 is low, outputs that accuracy level P is low. Guidance output section 77, for example, outputs that accuracy level P is low when accuracy level P for all identified users is lower than 60% (a specified value). That is, guidance output section 77 is for notifying a caregiver that it is unclear whether the user currently identified by the user identifying section 75 is the actual user. Second, guidance output section 77, when assistance by assistance device 1 is started for a case in which the accuracy level P decided by user identifying section 75 is high, outputs encouragement to the user.

In the present embodiment, guidance output section 77 is provided with speaker 77a, display device 77b, lamp device 77c, and warning emitter 77d. Note that, guidance output section 77 does not have to be provided with all the above items and may be provided with any one or any selected combination of the above items.

Speaker 77a, as an output indicating that accuracy level P is low, may output audio to encourage the caregiver to say the name of care receiver M. For example, speaker 77a may output audio such as "Is that Mr X?", or "Say the full name of the user.". In this case, the caregiver may recognize that the accuracy level P is low and respond with "Yes, this is Mr X.". In this case, user identifying section 75 makes the accuracy level P higher (refer to later descriptions). Also, speaker 77a may output messages of support as an output when accuracy level P is high. For example, speaker 77a may output audio such as "Come on, Mr X.".

Display device 77b, as output when accuracy level P is low, may change the display method on the display screen. For example, display device 77b may display a message on the display screen such as "Is that Mr X?". Also, display device 77b may display support messages as an output when accuracy level P is high.

Also, display device 77b may change the color of the display screen to a warning color. Further, lamp device 77c, as an output when accuracy level P is low, may change the lamp display method. For example, lamp device 77c may display yellow or may flash yellow. Also, warning emitter 77d may emit a warning sound such as a beep or a bell. Note that, speaker 77a, display device 77b, lamp device 77c, and warning emitter 77d may all operate, or a caregiver or care receiver M may select one to operate.

In the present embodiment, guidance output section 77 is arranged on control unit 7 positioned on the upper right of frame 21, but guidance output section 77 may be arranged in various locations. For example, guidance output section 77 may be attached to oscillating section 4 or body supporting member 5.

Further, guidance output section 77 may be provided separately to main body items of the assistance device (2, 3, 4, 5, 6, 71). In this case, guidance output section 77, for example, may acquire data via wireless communication with user identifying section 75 and then output guidance. Such a guidance output section 77, for example, may be configured from a mobile terminal such as a tablet or smartphone, a mobile speaker, a mobile display device, a beeper, or the like. Note that, main body items of the assistance device include base 2, raising and lowering section 3, oscillating section 4, body supporting member 5, load detector 6, and control device 71.

Further, user information memory section 73, name acquiring section 74, user identifying section 75, and operation data memory section 76 are not necessarily built into control unit 7, they may be provided separately to main body items of the assistance device (2, 3, 4, 5, 6, 71). In this case, user information memory section 73, name acquiring section 74, user identifying section 75, and operation data memory section 76, for example, may be provided in a host computer (not shown) or may communicate wirelessly with control device 71 and guidance output section 77.

Processing by User Identifying Section 75

Processing by user identifying section 75 is described with reference to FIGS. 8 to 12. Processing by user identifying section 75 includes processing assistance device 1 user identifying processing and accuracy level determining processing. As shown in FIG. 8, user identifying section 75, first, performs in parallel first correction value determining processing (S1), second correction value determining processing (S2), and third correction value determining processing (S3).

Figure 9:
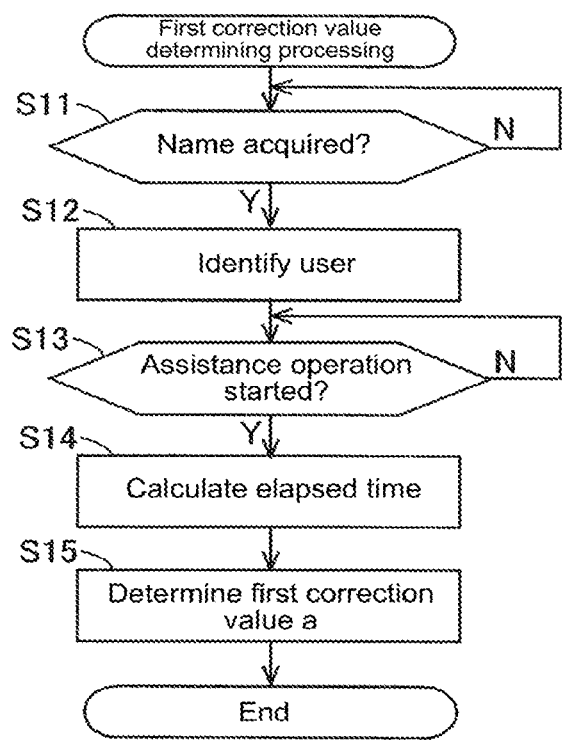
FIG. 9 is a flowchart related to first correction value determining processing among processing by the user identifying section.

First correction value determining processing determines first correction value a such that accuracy level P is higher as the elapsed time from identifying the user to starting assistance of assistance device 1 is shorter, and such that accuracy level P is lower as the elapsed time is longer. In detail, as shown in FIG. 9, user identifying section 75 determines whether a name has been acquired by name acquiring section 74 (S11). If a name has not been acquired (S11: N), the determination is repeated until a name is required.

If a name has been acquired (S11: Y), user identifying section 75 identifies the user (S12). Here, user identifying section 75 references the user information memorized on user information memory section 73 to identify the care receiver M linked to the name as the user. Continuing, user identifying section 75 determines whether operation by assistance device 1 has started (S13). If assistance operation has started (S13: Y), user identifying section 75 calculates the elapsed time from identifying the user (from acquiring the name) to the starting of assistance (S14).

Then, user identifying section 75 determines first correction value a in accordance with the elapsed time (S15). First correction value a is, for example, "+20%" when the elapsed time is shorter than a first specified time, "0%" when the elapsed time is between the first specified time and a second specified time, and is "−20%" when the elapsed time is longer than the second specified time. The quantity of levels and the values thereof may be changed as appropriate.

Here, usually, the name of care receiver M will be said many times. First correction value determining processing is performed every time a name is acquired. Thus, if a user for which first correction value a has already been calculated and a user for which first correction value a is newly calculated are the same person, only the latest value is memorized as first correction value a. On the other hand, if a user for which first correction value a has already been calculated and a user for which first correction value a is newly calculated are not the same person, a first correction value a is memorized for each of those users.

Figure 10:
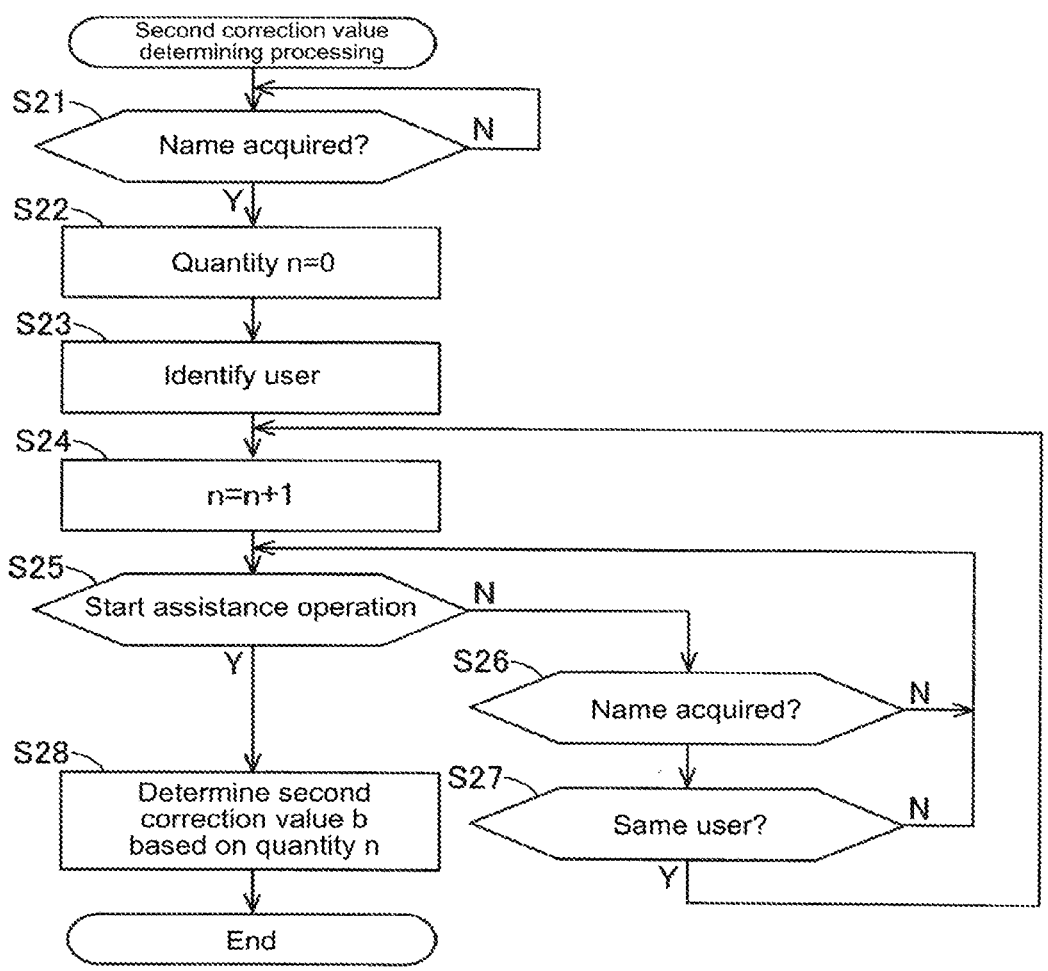
FIG. 10 is a flowchart related to second correction value determining processing among processing by the user identifying section.

Second correction value determining processing determines second correction value b such that, in a case in which multiple names are acquired by name acquiring section 74, accuracy level P is higher when the acquired quantity is larger, and such that accuracy level P is lower when the acquired quantity is smaller. In detail, as shown in FIG. 10, user identifying section 75 determines whether a name has been acquired by name acquiring section 74 (S21). If a name has not been acquired (S21: N), the determination is repeated until a name is required.

If a name has been acquired (S21: Y), user identifying section 75 initializes the called quantity n as "0" (S22). Continuing, user identifying section 75 identifies the user based on the name (S23). Here, user identifying section 75 references the user information memorized on user information memory section 73 to identify the care receiver M linked to the name as the user. Continuing, user identifying section 75 adds "1" to the called quantity n (S24). First, the quantity n is "1".

Continuing, user identifying section 75 determines whether operation by assistance device 1 has started (S25). If assistance operation has not started yet (S25: N), user identifying section 75 determines again whether a name has been acquired (S26). If a name has not been acquired again, (S26: N), user identifying section 75 performs processing of S25 again.

On the other, if a name has been acquired again (S26: Y), user identifying section 75 determines whether the acquired name and the name of the person already identified are the same person. If they are not the same person (S27: N), user identifying section 75 performs processing of S25 again. On the other hand, if they are the same person (S27: Y), that is, a name has been acquired for the same person two or more times, user identifying section 75 performs processing of S24 again. In other words, "1" is added to the called quantity n. In this manner, in a case in which a name of the same person is acquired multiple times, called quantity n is calculated.

Then, in a case in which assistance operation has started in S25 (S25: Y), second correction value b is determined based on called quantity n (S28). Second correction value b, for example, may be "+20%" in a case in which quantity n is larger than a first specified quantity, may be "0%" in a case in which quantity n is between the first specified quantity and a second specified quantity, and may be "−20%" in a case in which quantity n is smaller than the second specified quantity. Note that, the quantity of levels and the values thereof may be changed as appropriate. Further, similar to with first correction value, a, second correction value b is determined for each identified user.

Figure 11:
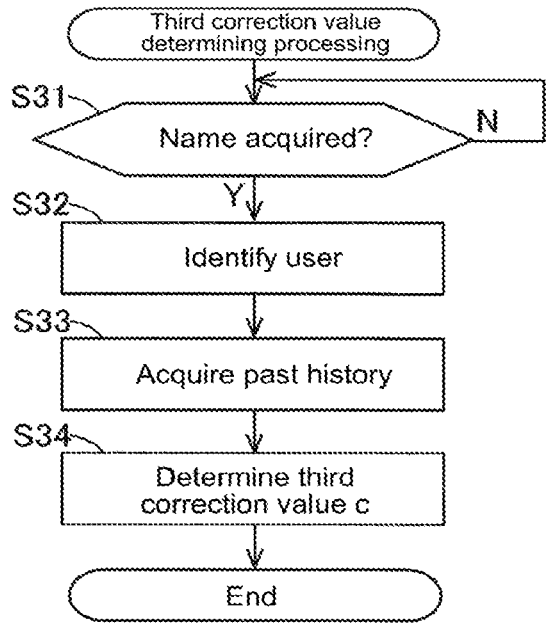
FIG. 11 is a flowchart related to third correction value determining processing among processing by the user identifying section.

Third correction value determining processing determines third correction value c based on a past user history of the assistance device 1. In detail, as shown in FIG. 11, user identifying section 75 determines whether a name has been acquired by name acquiring section 74 (S31). If a name has not been acquired (S31: N), the determination is repeated until a name is required.

If a name has been acquired (S31: Y), user identifying section 75 identifies the user (S32). Here, user identifying section 75 references the user information memorized on user information memory section 73 to identify the care receiver M linked to the name as the user. Continuing, user identifying section 75 acquires a past history memorized in user information memory section 73 (S33). That is, user identifying section 75 is able to find out the past user history of the assistance device, in other words, who has used the assistance device 1 in the past and how many times.

Continuing, user identifying section 75 determines third correction value c based on the acquired past history (S34). Third correction value c, for example, may be "+20%" when a usage quantity in the past week is larger than a specified quantity, and "0%" when smaller than a specified quantity. In other words, when a recent frequent user is currently being called, it is determined to be highly likely that it is actually that user. Note that, the usage quantity in a case in which the accuracy level P memorized in user information memory section 73 is a specified value (for example, 60% or greater) is taken as the usage quantity to be counted here.

Returning to FIG. 8, processing by user identifying section 75 is described. When first correction value determining processing (S1), second correction value determining processing (S2), and third correction value determining processing) (S3) have been completed, user identifying section 75 calculates accuracy level P based on the formula P=x+ (a+b+c). Here, x is a base value of accuracy level P, and is set at 50%, for example. Note that, if accuracy level P exceeds 100%, user identifying section 75 may use the value exceeding 100% as accuracy level P, or may limit accuracy level P to 100%.

Continuing, user identifying section 75 determines whether guidance has been output by guidance output section 77 for a case in which accuracy level P is low. Here, in a case in which accuracy level P calculated in S4 for all the identified users is lower than 60%, as described above, guidance output section 77 outputs guidance that accuracy level P is low. For example, speaker 77a outputs audio such as "Is that Mr X?".

Figure 12:
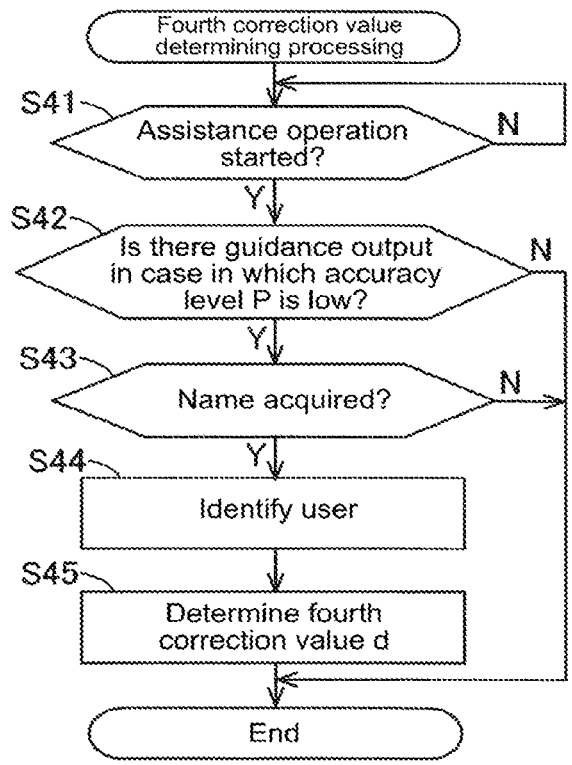
FIG. 12 is a flowchart related to fourth correction value determining processing among processing by the user identifying section.

Continuing, in a case in which guidance output section 77 outputs the guidance (S5: Y), user identifying section 75 performs fourth correction value determining processing (S6). As shown in FIG. 12, fourth correction value determining processing determines fourth correction value d. In other words, user identifying section 75 determines whether assistance operation has started (S41), and if it has started, determines whether guidance indicating that accuracy level P is low has been output (S42).

Continuing, user identifying section 75 determines whether a name has been acquired by name acquiring section 74 (S43). If a name has not been acquired, fourth correction value determining processing ends. For example, since speaker 77a outputs audio of "Is that Mr X?", a caregiver replied "Yes, this is Mr X.", using the name of the care receiver M. Thus, because the name was acquired, in this case, user identifying section 75 identifies the user based on the name (S44). Continuing, user identifying section 75 determines fourth correction value d (S45). Fourth correction value d is, for example, "+30%".

Returning to FIG. 8 again, processing by user identifying section 75 is described. User identifying section 75, after performing fourth correction value determining processing, recalculates accuracy level P based on the formula P=x+d (S7). In this case, that means accuracy level P becomes 80%. Here, the name acquired after the output by guidance output section 77 is called in response to the output of the guidance by guidance output section 77. Therefore, the name acquired here has a very high likelihood of being the user of assistance device 1. Accordingly, accuracy level P determined in S7 is a high value.

Effects of Embodiments

As described above, assistance device 1 that performs assistance to care receiver M to move, as shown in FIG. 5, is provided with speech detector 72, name acquiring section 74 that acquires a name of a person based on speech detected by speech detector 72, and user identifying section 75 that identifies a care receiver M who is a user of assistance device 1 based on the name acquired by name acquiring device 74.

In a care facility, caregivers frequently say the names of care receivers M. Thus, assistance device 1 acquires a name from speech spoken by a person and identifies a care receiver M as a user based on the acquired name. Because a caregiver can say the name of a care receiver M, it is possible to acquire the name regardless of whether the care receiver M can speak. Accordingly, it is possible to identify a user (care receiver M) that cannot speak. Also, even if a caregiver changes, the new caregiver can say the name of the care receiver M when providing assistance. Accordingly, a user (care receiver M) can be identified reliably even when a caregiver changes.

Also, assistance device 1 is provided with operation data memory section 76 that memorizes assistance operation data 1, data 2, and data 3 regarding assistance by assistance device 1 for care receiver M. Further, as shown in FIG. 7, operation data memory section 76 links and memorizes information of a user (user full name) identified by user identifying section 75 and assistance operation data 1, data 2, and data 3 memorized on operation data memory section 76.

Assistance device 1, by identifying a user, is able to easily link the identified user and assistance operation data 1, data 2, and data 3. In other words, the identified user and assistance operation data 1, data 2, and data 3 are linked automatically without the need for manual work. Because manual work is not required to do the linking, it is possible to link and store many users and assistance operation data 1, data 2, and data 3 sets.

Also, there are cases in which many names are included in the speech around an assistance device. Thus, in addition to identifying a user based on the acquired name, user identifying section 75 determines accuracy level P of the identified user. Then, operation data memory section 76, in addition to the user information (user full name) and the assistance operation data 1, data 2, and data 3, links and memorizes accuracy level P. Accordingly, assistance operation data 1, data 2, and data 3 can be used to understand the accuracy level P of whether it is the user. Thus, by considering accuracy level P of the user, assistance operation data 1, data 2, and data 3 can be used again.

Also, user identifying section 75, in first correction value determining processing, makes first correction value a larger as the elapsed time from identifying the user to starting assistance of assistance device 1 is shorter, and makes first correction value a smaller as the elapsed time is longer. In other words, user identifying section 75 makes accuracy level P higher as the elapsed time from identifying the user to starting assistance of assistance device 1 is shorter, and makes accuracy level P lower as the elapsed time is longer.

When a user is identified based on an acquired name, if the elapsed time from the identification to starting assistance is long, it is unclear whether the identified user is the actual user. For this, user identifying section 75 uses a different value for accuracy level P based on the elapsed time from the user being identified to the starting of assistance. Thus, user identifying section 75 is able to correctly determine accuracy level P of the user.

Also, user identifying section 75, as second correction value determining processing, in a case in which multiple names are acquired by name acquiring section, makes second correction value b larger the greater the acquired quantity n is, and makes second correction value b smaller the smaller the acquired quantity n is. In other words, user identifying section 75 makes accuracy level P higher the greater the acquired quantity n is, and makes accuracy level P lower the smaller the acquired quantity n is.

Multiple names are spoken around assistance device 1. Also, when using assistance device 1, a caregiver assists a care receiver M while saying the name of the care receiver M many times. Thus, as described above, user identifying section 75 determines accuracy level P of the user based on the name said quantity n. Thus, user identifying section 75 is able to correctly determine accuracy level P of the user.

Also, in a facility where assistance device 1 is set, there may be cases in which all care receivers M use assistance device 1 the same amount, or a case in which a portion of users uses assistance device 1 more frequently. For this, user identifying section 75, as third correction value determining processing, determines third correction value c based on a past user history (which corresponds to the past history shown in FIG. 7). That is, user identifying section 75 determines accuracy level P based on a past user history of assistance device 1. For example, in a case in which an identified user is a user who is a frequent user according to the past user history, the probability is high that the identified user is the actual user. In this case, user identifying section 75 makes accuracy level P high. Thus, user identifying section 75 is able to correctly determine accuracy level P of the user.

Also, assistance device 1 is provided with guidance output section that outputs guidance indicating that accuracy level P is low in a case in which assistance by assistance device 1 is started when accuracy level P is lower than a specified value (for example, 60%). By this, a caregiver is prompted to say the name of the user (care receiver M) by hearing the output guidance of guidance output section 77. Further, by a caregiver saying the name of the user (care receiver M), user identifying section 75 can make accuracy level P higher.

As an example of guidance output section 77, speaker 77a, as an output indicating that accuracy level P is low, may output audio to encourage the caregiver to say the name of care receiver M. By using speaker 77a to output audio encouraging the name of the user (care receiver M) to be said, a caregiver can respond to the audio of speaker 77a by saying the name of the user (care receiver M). By doing this, user identifying section 75 can make accuracy level P higher.

Also, as another guidance output section 77, as a way of outputting that accuracy level P is low, display device 77b may change the display method on a display screen, lamp device 77c may change the lamp display method, or warning emitter 77d may emit a warning sound. Using these methods, a caregiver can easily understand that accuracy level P is low. Accordingly, the caregiver can say the name of the user (care receiver M). By doing this, user identifying section 75 can make accuracy level P higher. Also, the above can be easily applied to an assistance device 1 without speaker 77a.

Also, assistance device 1 is provided with user information memory section 73 that memorizes in advance a name of care receiver M as user information of assistance device 1. Further, user identifying section 75 selects the user from among the user information memorized on user information memory section 73 based on the acquired name. Usually, among names said around assistance device 1, in addition to names of care receiver M, names of various people, such as caregivers, relatives of care receiver M, and the like are included. Even if a name of other than care receiver M is acquired, because user identifying section 75 can select from user information memorized in advance, a user other than care receiver M is not identified. That is, user identifying section 75 can identify a care receiver M who is a user with high accuracy.

Also, user information memory section 73, in a case in which multiple names exist for a single person, memorizes the multiple names as user information for a single care receiver M. Further, user identifying section 75, in a case in which multiple names acquired by name acquiring section 74 are names of the same single person in the user information, determines that the multiple acquired names are names of the same single person and selects the user.

Generally, among a person's names, there are names that use a family name, names that use a first name, and names unrelated to a full name, and there are also various titles. Therefore, even for the same person, there are cases of many names existing for that person. Here, user information memory section 73 memorizes multiple names as user information of a user of assistance device 1. Further, user identifying section 75, in a case in which multiple acquired names are names of the same person, identifies the user by determining that they are the same person. Accordingly, even if a different name is acquired, the user can be identified with high accuracy.

Note that, even if the user is not memorized in advance in user information memory section 73, user identifying section 75 can identify the user. In particular, by setting each of correction value a, b, and c appropriately, user identifying section 75 can suitably identify the user. However, as described above, by memorizing user information on user information memory section 73, it is possible to identify a user with higher accuracy.

REFERENCE SIGNS LIST

1: assistance device;
2: base;
3: raising and lowering section;
4: oscillating section;
5: body supporting member;
6: load detector;
31: raising and lowering member;
32: raising and lowering drive section;
41: oscillating member;
42: oscillating drive section;
51: torso support member;
52: underarm support member;
61: first load detecting apparatus;
62: second load detecting apparatus;
71: control device;
72: speech detector;
73: user information memory section;

74: name acquiring section;
75: user identifying section;
76: operation data memory section;
77: guidance output section;
77a: speaker;
77b: display device;
77c: lamp device;
77d: warning emitter;
Data1, Data2, Data3: assistance data;
M: care receiver;
P: accuracy level

The invention claimed is:

1. An assistance device for assisting movement of a care receiver, the assistance device comprising:
a processor configured to:
detect speech;
acquire a name of a person based on the speech;
identify a user of the assistance device based on the name that is acquired;
memorize assistance operation data of the assistance device;
determine an accuracy level of the user that was identified; and
link and memorize information of the user that was identified and the accuracy level with the assistance operation data.

2. The assistance device according to claim 1, wherein the processor is configured to:
make the accuracy level higher as an elapsed time from identifying the user to starting assistance of the assistance device is shorter, and
make the accuracy level lower as the elapsed time is longer.

3. The assistance device according to claim 1, wherein the processor is configured to, in a case in which multiple types of names are acquired:
make the accuracy level higher when a quantity of the multiple types of names is larger, and
make the accuracy level lower when the quantity is fewer.

4. The assistance device according to claim 1, wherein the processor is configured to determine the accuracy level based on a past user history of the assistance device.

5. The assistance device according to claim 1, wherein the processor is configured to, in a case in which assistance by the assistance device is started with the accuracy level lower than a specified value, cause an output of guidance indicating that the accuracy level is low.

6. The assistance device according to claim 5, wherein the processor is configured to cause an output of audio to a caregiver encouraging the caregiver to say the name of the user as the output of guidance indicating that the accuracy level is low.

7. The assistance device according to claim 5, wherein the processor is configured to cause at least one of emitting a warning sound, changing a lamp display method, or changing a display method at a display screen as the output of guidance indicating that the accuracy level is low.

8. The assistance device according to claim 1, wherein the processor is configured to:
memorize in advance the name of the user as the information of the user, and
select the user from the memorized information of the user based on the name that is acquired.

9. The assistance device according to claim 8, wherein the processor is configured to:
in a case in which multiple names exist for a same person, memorize the multiple names as information of a single user, and
in a case in which the multiple names are acquired and are the multiple names of the information of the single user, determine the acquired multiple names as names of the same person and select the single user as the user.

* * * * *